July 26, 1955     H. HORLACHER     2,713,772
HYDRAULIC TRANSMISSION AND CONTROL FOR MACHINE TOOL TABLES
Filed Oct. 16, 1952     2 Sheets-Sheet 1

INVENTOR.
HERMAN HORLACHER
BY
H. K. Parsons + L. W. Wright
ATTORNEYS

July 26, 1955 H. HORLACHER 2,713,772
HYDRAULIC TRANSMISSION AND CONTROL FOR MACHINE TOOL TABLES
Filed Oct. 16, 1952 2 Sheets-Sheet 2

INVENTOR.
HERMAN HORLACHER
BY
H. N. Parsons & B. W. Wright.
ATTORNEYS

United States Patent Office 2,713,772
Patented July 26, 1955

2,713,772

HYDRAULIC TRANSMISSION AND CONTROL FOR MACHINE TOOL TABLES

Herman Horlacher, Cincinnati, Ohio, assignor to The Cincinnati Milling Machine Co., Cincinnati, Ohio, a corporation of Ohio Application October 16, 1952, Serial No. 315,107

6 Claims. (Cl. 60—52)

This invention relates to improvements in milling machines and has particular reference to an improved hydraulic transmission and control for actuation of such machines.

One of the principal objects of the present invention is the provision of a novel and improved hydraulic transmission and control for milling machines which will facilitate the satisfactory utilization of a single pump for effecting both feed and rapid traverse actuations of the table or other controlled slide of the machine.

A further object of the present invention is the provision in connection with a back pressure throttled hydraulic control system for milling machines, of means variably to determine the output setting of a variable delivery actuating pump in accordance with variations in the back pressure of the hydraulic system.

A further object of the invention is the provision of an improved hydraulic actuating system including a variable delivery pump, and output control mechanism subject to the joint control of the varying forward pressure and back pressure conditions of the system to insure satisfactory operation without undue building up of pressure conditions or attendant power waste during operation of the machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figures 1, 3:
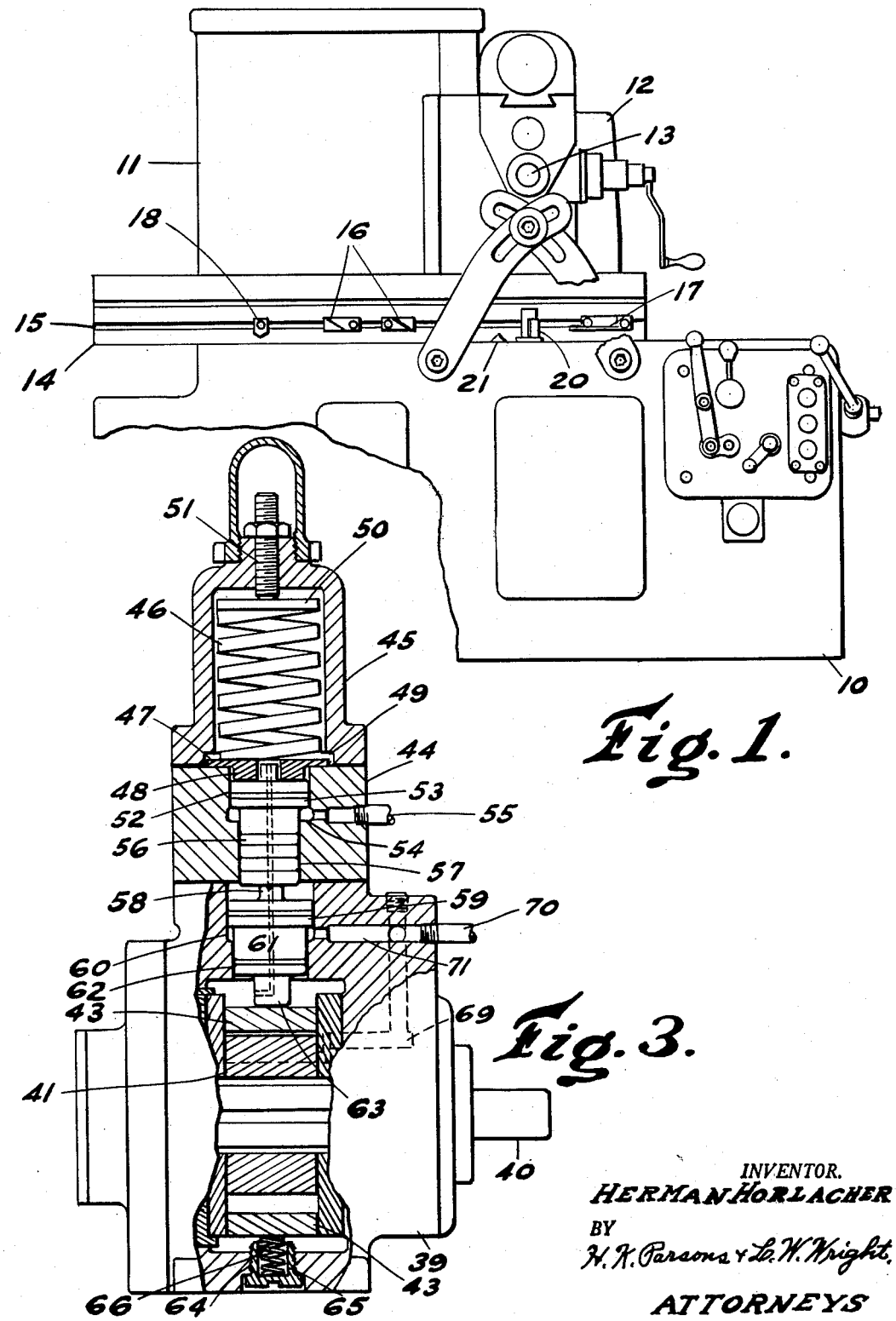
Figure 1 is a fragmentary view of a milling machine and automatic controls therefor embodying the present invention.
Figure 3 is an enlarged sectional view of the essential control elements of the actuating variable delivery pump.

The numeral 10 designates the base of a bed type milling machine having rising therefrom the column 11 supporting the cutter head 12. Mounted on the bed for translation relative to the cutter bearing spindle 13 of the cutter head is the table 14 provided with a dog slot 15. Mounted in this slot are the feed and rapid traverse selector dogs 16, the reversing dogs 17 and stop dog 18. The selector dogs 16 cooperate with the abutments 18a on the control plunger 19 journaled in the bed 10 for up and down or axial movement of the plunger, which is also provided with the wing lug 20 engageable by the reversing dog 17 for effecting rotation of the plunger. Adjacent the plunger is the trip rod 21 engageable by stop dog 18. The plunger 19 is coupled with the pilot valve shifter rod 22 in any desired manner for imparting oscillatory and longitudinal movements to the rod in accordance with the positioning of the plunger as indicated, for example, in United States Patent 2,043,406 of June 9, 1936. At the one end the rod is provided with the control lever 23 and at its opposite end the rod extends into the pilot valve unit 24 of conventional type. The structure of the pilot valve itself has not been illustrated as not specifically forming any part of the present invention, but it may, for example, be of the nature of any known conventional form as, for example, the pilot valve structure shown in Figure 10 of said Patent 2,043,406.

For actuation or reciprocation of the table 14 on the bed 10, the hydraulic cylinder 25 carried by the bed contains piston 26 connected to bracket 27 of the table by a piston rod 28. Conduit 29 is coupled with one end of the cylinder, and conduit 30 with the opposite end. These conduits extend respectively to grooves 31 and 32 of bushing 33 which contains the reversing valve 24. This bushing is closed at its ends to provide cylinders coupled by conduits 35 and 36 with pilot valve 24. A pressure conduit 37 extends from the pump 38 to the pilot valve so that by suitable positioning of the pilot valve pressure may be introduced as shown into the right hand end of the reversing valve bushing, moving the valve to the left or oppositely by introduction of pressure into the left end of the bushing and coupling through the right hand end of the pilot valve to the reservoir return connection 39' of the pilot valve the reversing valve may be actuated in the opposite direction.

The pump 38 comprises the outer housing or casing 39 in which is journaled the pump shaft 40 driven from a suitable source and supporting the rotor 41 with sliding vanes 42 mounted within the eccentrically adjustable barrel 43, the extent of eccentric displacement of the barrel 43 determining the effective pumping action or volumetric displacement capacity of the pump. Mounted on the casing 39 is the control valve block 44, in turn supporting the housing 45 for spring 46. This spring reacts at one end against the flange 47 of disc 48 to hold this flange seated against the block 44. The housing 45 is formed with a recess 49 receiving the flange and serving as a limit to outward movement of the disc in compression of spring 46. At its opposite end the spring engages abutment 50 variably positionable by adjusting the screw 51 carried by the upper end of the housing 45.

The block 44 is formed with a cylindrical chamber 52 receiving piston 53 and having an enlarged chamber portion at 54 to which is coupled the return pressure conduit 55. The piston 53 extends downwardly and has guide extension 56 sliding in the bore 57 of block 44 and at its lower end engages the lug or abutment 58 of a second control piston 59 slidable in cylinder 60 of housing 39. This piston has a guide portion 61 movable in the bore 62 of housing 39 and terminates in a reduced diameter portion 63 which abuts the periphery of the barrel 43. By the structure thus described the spring 46 through the pair of superimposed piston elements reacts on the barrel, forcing the same to a maximum adjustment position as determined by the adjustment limiting abutment screw 64. This screw abutment is socketed at 65 to receive spring 66 oppositely reacting against the barrel and tending to push the same from maximum displacement toward a concentric relationship or neutral on any outward movement of the pistons, which relieves the barrel of the full force reaction of spring 46.

Coupled to the pump housing is intake conduit 67 extending into the reservoir 68, while pressure from the pump is collected by built-in conduit 69 and delivered to the machine through main pressure conduit 70. Additionally, built into the housing 39 is conduit 71 coupling the pump created pressure to cylinder 60 beneath piston 59 tending to lift or force the piston outward away from contact with barrel 43 so that the barrel may move to reduce the pump output as pressure in the conduit system 69—70 increases.

Figure 2:
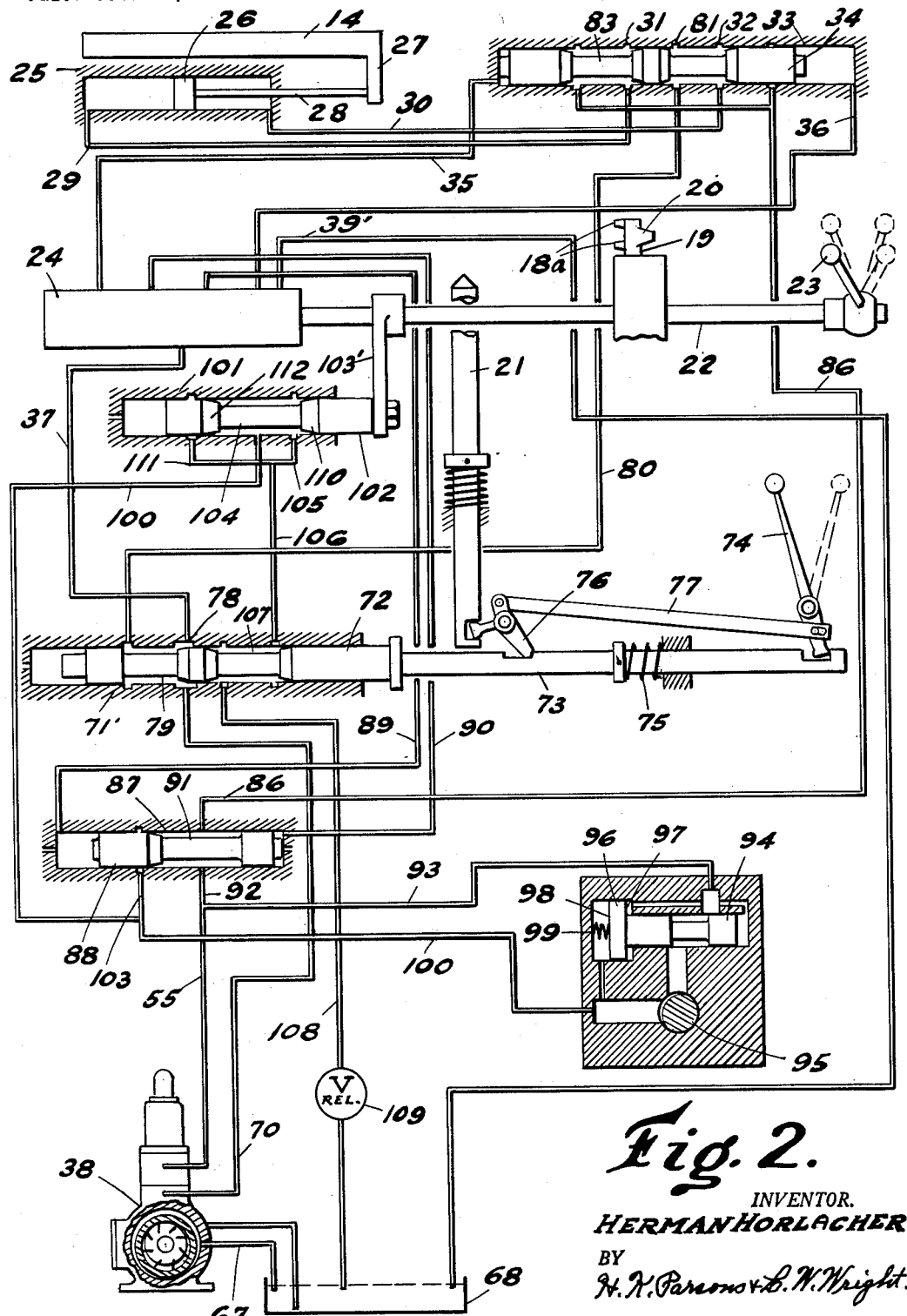
Figure 2 is a diagrammatic view of the hydraulic actuating system and controls for the machine.

The pressure conduit 70 extends to the bushing 71' of the run-stop valve 72 controlled by rod 73 actuable by the start-stop lever 74, the parts being shown in running position. A spring 75 tends to urge the valve 72 into its stop position from which it is held during operation of the table by latch 76 alternatively releasable by dog effected movement of plunger 21 or by link 77 as the lever 74 is moved toward the stop position. The pressure conduit terminates in a groove 78 to which is coupled the pressure conduit 37 for pilot valve 24. The valve also has a groove 79 which in the running position couples the operating pressure by way of conduit 80 and groove 81 of bushing 33 of the reversing valve 34. This position, as has been described, is controlled through the pilot valve conduits 35 and 36. In Figure 2 this valve is shown in its left hand position coupling groove 81 with groove 32 of cylinder conduit 30 to the right hand end of table cylinder 25.

At the same time the left hand cylinder conduit 29 is connected by the groove 83 of the valve to return pressure line 86 which is coupled to bushing 87 of the feed or rapid traverse selector valve 88. The position of this valve is determined by the alternative coupling of pressure and exhaust to the pilot conduits 89 and 90 which extend to the pilot valve 24. In this manner the position of the feed or rapid traverse selector valve is determined by way of the pilot valve in accordance with the respective positionings of the control lever 23, although it will be understood that alternatively adjustment of the valve could be directly mechanically effected if desired.

In Figure 2 the valve 88 has been shown in its right hand position in which its groove 91 couples 86 with conduit 92 having a first branch 93 extending to the rate determining valve 94 and a second branch 55 coupling the back pressure conduit system with the chamber 54 for the piston 53. This rate control valve may be of any standard commercial type including an adjustable rate determining throttle 95 and a pressure controlled throttle valve 96 having a piston area 97 acted upon by the return pressure ahead of the throttle and a portion 98 acted on by the spring 99, tending to open the throttle. Such a construction insures a constant pressure drop across the throttle, and consequently a constant throttle determined rate of flow irrespective of the actual existing pressure in the conduits leading to said throttle valve structure. The discharge conduit 100 from the rate valve extends to the bushing 101 of the delay throttle and blocking valve 102. The conduit further has a branch 103 extending to the bushing 87 for valve 88 which in the position shown is blocked. However, when this valve 88 is moved to its left hand position, conduit 86 will be coupled directly by way of 103 to valve bushing 101, thus short circuiting or rendering ineffective the rate control valve. Valve 102 is coupled by arm 103' for translation in accordance with movement of rod 22. As shown, the parts are in a running position and groove 104 of valve 102 couples conduit 100 by way of branch 105 and conduit 106 and groove 107 of valve 72 to reservoir return conduit 108 maintained at a suitable low back pressure by relief valve 109, the conduit 108 discharging into reservoir 68.

When rod 22 is shifted toward the left to actuate the pilot valve structure for reversal of position of valve 34 and thus reversal of the actuating and back pressure conduit connections to the ends of cylinder 25 valve 102 will likewise be moved to the left. During this movement the tapered shoulder 110 will gradually throttle and close off the flow from 100 by way of groove 104 to branch conduit 105 effecting a temporary slowing down or blocking of the return pressure flow to eliminate shock in reversal of reaction of the actuating medium with respect to piston 26.

Continued movement of valve 102 toward the left will unblock branch 111 of conduit 106 as the tapered portion 112 of the opposite bounding shoulder of groove 104 passes the inlet groove of the branch conduit 111, thus gradually releasing the blocking of pressure flow from conduit 100 to 106. Any such blocking of flow through the conduit 100 will increase the general pressure conditions existing in the hydraulic control circuit, reacting through conduit 70 against piston 59, tending to raise the piston and permit the pump barrel 43 to move toward a position reducing the volumetric output of the variable delivery pump. At the same time, the back pressure reacting through conduit 55 will tend to raise piston 52 and aid in effecting the desired compression of spring 46 for release of the barrel so that the forward and back pressures cooperate and are jointly additively effective to determine the barrel position and thus the quantity of oil displaced or delivered by the pump under any combination of pressure conditions.

The structure here illustrated is adapted for utilization of a single variable delivery pump for effecting both rapid traverse and feeding movements of the table 14. For effecting rapid traverse the pump under the influence of spring 46 is urged to its position of maximum volumetric delivery and the flow of actuating pressure fluid to the cylinder 25 is by way of conduits 70, 80, and 30 with the control valves in the position shown in Figure 2. The return flow from the control cylinder is by way of conduits 29 and 86 to valve bushing 87. Valve 88, however, is shifted into its left hand position, blocking or short circuiting the flow as respects the rate determinator 94 and coupling the return flow by way of conduits 100, 106, 108 to reservoir. With this setting the only resistance in the return or exhaust line is that of the low pressure release valve 109, and the resistance to movement of table 14 is sufficiently low so that a relieving or pump volume reducing pressure will not be developed in the forward line 69—70 or in the rear pressure line 55. However, should the table meet an unexpected resistance or the piston 26 move to the end of the cylinder the forward pressure will then build up, raising piston 61 and permitting the barrel 43 to move in the direction of or completely to a neutral or non-pumping position.

When it is desired to effect feeding movement, the valve is restored to the position shown in Figure 2. In this position the return conduit 86 is coupled by 93 to the rate determinator and by 55 to the piston chamber 54. The rate determinator slowing down of the flow from 93 to 100 will cause a blocking of the return conduit and a consequent building up of pressure in the conduit 55. At the same time this blocking effect will resist movement of piston 26 so that pressure will be built up in conduit 70. These built-up pressures react respectively on the pistons 52 and 59 jointly to compress the spring 46, permitting the barrel 43 to move under the influence both of internal pressure and positive pressure of the spring 44 to diminish the volume of actuating fluid put out by the pump to a point where the pump output corresponds substantially to the selected rate of flow from 93 to 100 as determined by the setting of the throttle 95. At this point a condition of equilibrium will be established in which an adequate and high enough pressure will be maintained by the pump to effect the desired movement of the work table 14 in opposition to the cutter, the maximum pressure developed by the pump, however, being taken up by work and table resistance so that but low resistance or back pressure will then exist in conduit 93. In other words, under working conditions there will be a pressure drop in the rear pressure conduit system including line 93 below the normal idle feeding pressure as determined by the pressure differential spring 99 in the feed determinator 94.

For example, the parts of the machine may be so adjusted that for non-cutting feeding movement of the table 14 there may be a forward pressure of 200 pounds opposed by a back pressure of 150 pounds with a stabilized position of the pump barrel 43 so that the pump will discharge into the forward pressure line an amount of fluid corresponding to that which the 150 pound pressure will discharge through the rate determinator 94, corresponding to the flow or feed setting of the rate valve. Assuming a condition in which the cut resistance amounts to one hundred pounds, this value can be automatically attained through employment of the present invention without undue rise or wastage of power by relief valve bypassing surplus pressure medium or the like.

The additional one hundred pounds pressure resistance is met, the back pressure will drop and the forward pressure will rise without any readjustment of control spring 46.

Correspondingly, fluctuations in the work resistance or completion of the cut will reflect in the combination of forward pressure through conduit 71 to piston 59 and the back pressure through other conduit 55 to piston 52 to determine the compression load on spring 46 and thus the pump barrel position.

It will be evident that when valve 72 is moved to the left that pressure line 70 will be directly connected to exhaust line 108 so that the pump will be performing no work, and there will be no back pressure resistance except such as is offered by the valve 109 and the pump can then operate freely under a condition of maximum delivery. It will further be evident that when a reversal of direction of the movement of the table 14 is being effected by shifting of valve 34 that the concomitant movement of valve 102 will either throttle or shut off the flow from 100 to 106 as by shoulder 110, establishing a high back pressure condition in 55 to move piston 59 in a direction to compress spring 46, relieving member 43 of its restraining pressure. This will permit the member to move toward a zero delivery position, either by inherent centralizing action of the pump, or by additive contralizing action of positive shifting means such as the spring 64. Such action will slow down or stop the delivery of the pump, and continued movement of the valve will gradually open the throttle provided as by shoulder 112, decreasing the back pressure so that the pump delivery will increase. This action facilitates smooth and shockless reversal of the carriage 14, and continued movement of the valve will gradually open the throttle provided as by shoulder 112, decreasing the back pressure so that the pump delivery will increase. This action facilitates smooth and shockless reversal of the carriage 14. The zeroizing is assisted by the simultaneous increase in the forward pressure due to the throttling or blocking action and the reaction of this pressure against piston 59.

What is claimed is:

1. A hydraulic transmission and control for a machine tool table including a hydraulically actuable motor for the table, a variable displaceable VD pump, a reservoir, a forward pressure conduit system and a back pressure conduit system interconnecting said pump, motor and reservoir, said pump including a member shiftable to vary the volumetric discharge of the pump into the pressure conduit system, a spring reacting on said member to shift the same toward a maximum discharge position, and a pair of pressure cylinders, a piston in each cylinder positioned to react against the spring, the forward pressure conduit system including a pressure conduit coupled with one of said cylinders in such position that the pressure will react on its piston to compress the spring, and the back pressure conduit system including a conduit coupled to the other cylinder in such position that the back pressure will react correspondingly on the other piston, a rate valve in the back pressure conduit system, the back pressure cylinder conduit being connected to said system intermediate the motor and said rate valve, and valve means in the back pressure conduit system between the motor and rate valve movable to by-pass the rate valve and thus reduce the back pressure.

2. A hydraulic transmission and control for a machine tool table including a hydraulically actuable motor for the table, a variable displaceable VD pump, a reservoir, and a forward pressure conduit system and a back pressure conduit system interconnecting said pump, motor and reservoir, said pump including a member shiftable to vary the volumetric discharge of the pump into the pressure conduit system, a spring reacting against said member and exerting a pressure to shift the same toward a maximum discharge position, and a pressure cylinder between the spring and member, a piston in the cylinder, the back pressure conduit system including a conduit coupled to the pressure cylinder in such position that the back pressure will react on the piston to reduce the pressure of the spring against the member, and a throttle in the back pressure conduit system to vary the back pressure reacting on the piston said throttle including a settable rate valve and a supplemental pressure controlled throttle maintaining a constant pressure drop and rate flow across the settable throttle irrespective of the discharge position of the pump.

3. A hydraulic transmission and control for a machine tool table including a hydraulically actuable motor for the table, a variable displaceable VD pump, a reservoir, and a forward pressure conduit system and a back pressure conduit system interconnecting said pump, motor and reservoir, said pump including a member shiftable to vary the volumetric discharge of the pump into the pressure conduit system, a spring reacting against said member and exerting a pressure to shift the same toward a maximum discharge position, and a pressure cylinder between the spring and member, a piston in the cylinder, the back pressure conduit system including a conduit coupled to the pressure cylinder in such position that the back pressure will react on the piston to reduce the pressure of the spring against the member, a throttle in the back pressure conduit system to vary the back pressure reacting on the piston said throttle including a settable rate valve and a supplemental pressure controlled throttle maintaining a constant pressure drop and rate flow across the settable throttle irrespective of the discharge position of the pump, and a valve in the back pressure conduit system shiftable to disconnect the throttle as respects the conduit to the pressure cylinder.

4. A hydraulic transmission and control for a machine tool table including a hydraulically actuable motor for the table, a variable displaceable VD pump, a reservoir, and a forward pressure conduit system and a back pressure conduit system interconnecting said pump, motor and reservoir, said pump including a member shiftable to vary the volumetric discharge of the pump into the pressure conduit system, a spring reacting against said member and exerting a pressure to shift the same toward a maximum discharge position, and a pressure cylinder between the spring and member, a piston in the cylinder, the back pressure conduit system including a conduit coupled to the pressure cylinder in such position that the back pressure will react correspondingly on the piston to reduce the pressure of the spring against the member, a throttle in the back pressure conduit system to vary the back pressure reacting on the piston said throttle including a settable rate valve and a supplemental pressure controlled throttle maintaining a constant pressure drop and rate flow across the settable throttle irrespective of the discharge position of the pump, a valve in the back pressure conduit system shiftable to disconnect the throttle as respects the conduit to the pressure cylinder, and an additional throttling valve in the back pressure conduit system shiftable to block the flow in the system, whereby the back pressure will rise to actuate the piston to decrease the pressure of the spring against the pump volume control member.

5. A hydraulic transmission and control for a machine tool table including a hydraulically actuable motor for the table, a variable displaceable VD pump, a reservoir, and a forward pressure conduit system and a back pressure conduit system interconnecting said pump, motor and reservoir, said pump including a member shiftable to vary the volumetric discharge of the pump into the pressure conduit system, a spring reacting against said member and exerting a pressure to shift the same toward a maximum discharge position, and a pressure cylinder between the spring and member, a piston in the cylinder, the back pressure conduit system including a conduit coupled to the pressure cylinder in such position that the back pressure will react correspondingly on the piston to reduce the pressure of the spring against the member, a throttle in the back pressure conduit system to vary the back pressure reacting on the piston said throttle including a settable rate valve and a supplemental pressure controlled throttle maintaining a constant pressure drop and rate flow across the settable throttle irrespective of the discharge position of the pump, a valve in the back pressure conduit system shiftable to disconnect the throttle as respects the conduit to the pressure cylinder, an additional throttling valve in the back pressure conduit system shiftable to block the flow in the system, whereby the back pressure will rise to actuate the piston to decrease the pressure of the spring against the pump volume control member, and means for shifting the pump member toward a zero discharge position when the piston is actuated.

6. A hydraulic transmission and control for a machine tool table including a hydraulically actuable motor for the table and a hydraulic actuating circuit for the motor including a VD pump having a movable pressure output determining portion and an output discharge conduit, means for urging said portion to a position of maximum discharge, pressure controlled means for determining said discharge including a first piston coupled with the output conduit and positioned to react against the pump portion urging means to reduce the effective force of said means, a second piston positioned additively to react against the pump portion urging means, and a back pressure conduit system, said back pressure conduit system including a rate throttling valve, means for maintaining a constant pressure drop across said valve to maintain a constant rate of back pressure discharge across the valve irrespective of back pressure variations, and a branch conduit connected to said back pressure system ahead of the rate valve and to the second piston, whereby the back pressure ahead of said rate valve reacts against said second piston additively as respects the pump output pressure in control of the position of the movable pump portion, and the joint additive effect of the output pressure on one piston and the back pressure ahead of the throttle on the other piston determines the setting of the movable portion of the pump.

References Cited in the file of this patent

UNITED STATES PATENTS

| 1,359,679 | Fee | Nov. 23, 1920 |
| 2,166,423 | Clark | July 18, 1939 |
| 2,374,630 | Tucker | Apr. 24, 1945 |
| 2,432,305 | Geiger | Dec. 9, 1947 |
| 2,436,986 | Ashbaugh | Mar. 2, 1948 |